United States Patent [19]
Protheroe et al.

[11] Patent Number: 5,380,958
[45] Date of Patent: Jan. 10, 1995

[54] HANDWRITING CAPTURE DEVICE

[75] Inventors: Robert L. Protheroe; David C. Wills; Scott M. Klement, all of Cambridge, Ohio

[73] Assignee: NCR Corporation, Dayton, Ohio

[21] Appl. No.: 33,690

[22] Filed: Aug. 12, 1993

Related U.S. Application Data

[63] Continuation of Ser. No. 878,671, May 5, 1992, Pat. No. 5,227,590.

[51] Int. Cl.⁶ .............................................. G08C 21/00
[52] U.S. Cl. ............................................ 178/18; 178/19
[58] Field of Search .......................... 178/18, 19, 20; 382/313; 375/156, 173, 174, 179, 901

[56] References Cited

U.S. PATENT DOCUMENTS

| | | | |
|---|---|---|---|
| 3,204,356 | 9/1965 | Close et al. | 40/10 |
| 3,514,874 | 6/1970 | Strohl | 35/37 |
| 4,475,239 | 10/1984 | van Raamsdonk | 382/57 |
| 4,493,104 | 1/1985 | Lukis et al. | 382/13 |
| 4,600,807 | 7/1986 | Kable | 178/19 |
| 4,649,232 | 3/1987 | Nakamura et al. | 178/18 |
| 4,679,241 | 7/1987 | Lukis | 382/13 |
| 4,752,965 | 6/1988 | Dunkley et al. | 382/3 |
| 5,049,862 | 9/1991 | Dao et al. | 340/706 |
| 5,120,906 | 6/1992 | Protheroe et al. | 178/18 |
| 5,157,737 | 10/1992 | Sklarew | 382/13 |

FOREIGN PATENT DOCUMENTS 3113105 10/1982 Germany.

OTHER PUBLICATIONS

U. S. patent application Ser. No. 07/575,096, filed Aug. 30, 1990 (NCR Docket No. 4476).

Primary Examiner—Stephen Chin
Assistant Examiner—Paul Loomis
Attorney, Agent, or Firm—Paul W. Martin

[57] ABSTRACT

A handwriting capture device which employs a highly sensitive digitizer to accurately capture signature information entered using a writing force greater than or equal to a predetermined writing force. The handwriting capture device includes a housing having a top surface, a resistive membrane digitizer mounted in the top surface and having a low pattern density, a layer of urethane rubber for frictionally holding the receipt in place, circuitry for processing digitizer information, a clamp for retaining a receipt in place over the digitizer during movement of the device, and circuitry for sensing the presence of the receipt and for activating data capture by the digitizer when the receipt is positioned under the clamp. In the preferred embodiment, the clamp also serves to minimize finger contact with the digitizer.

29 Claims, 3 Drawing Sheets

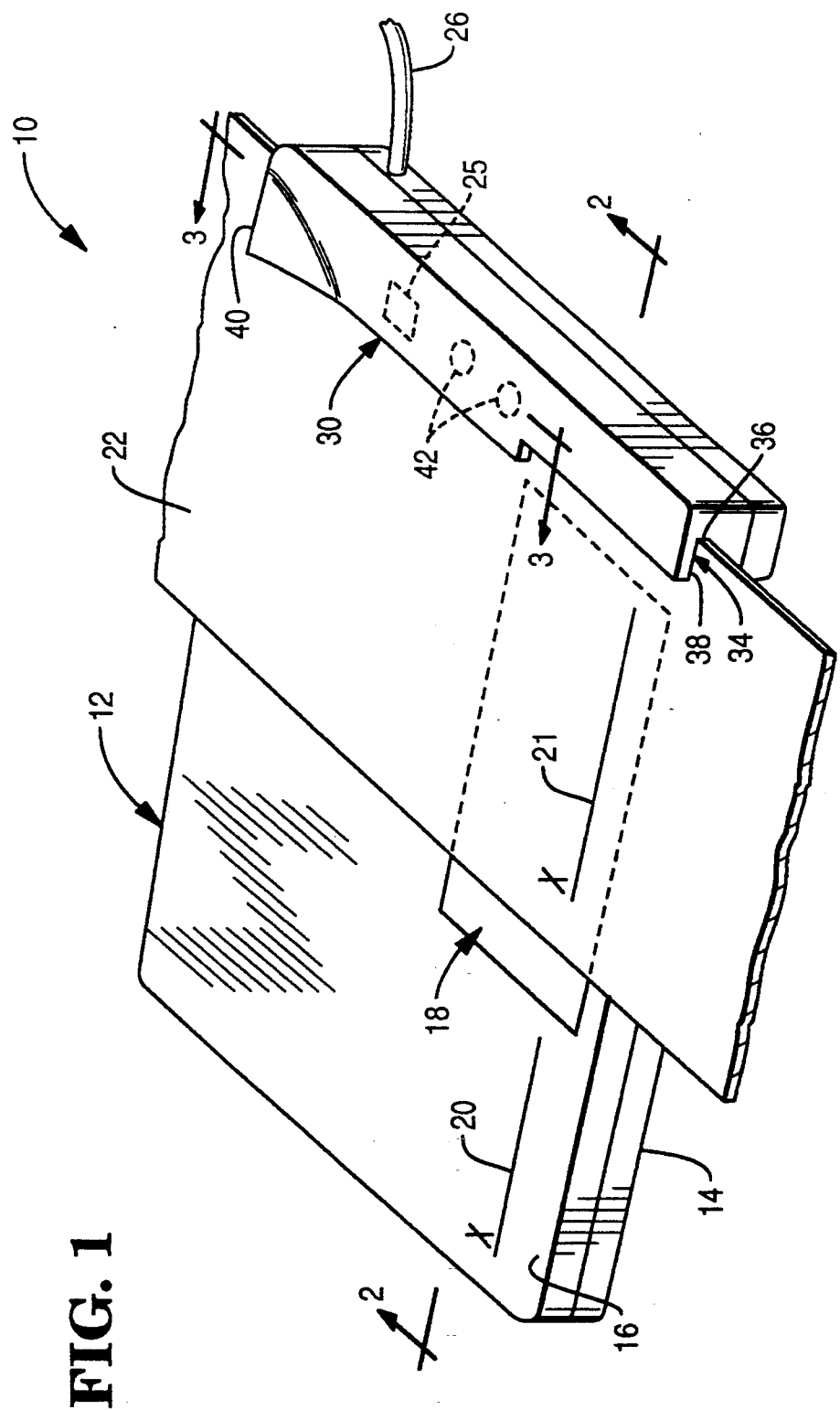

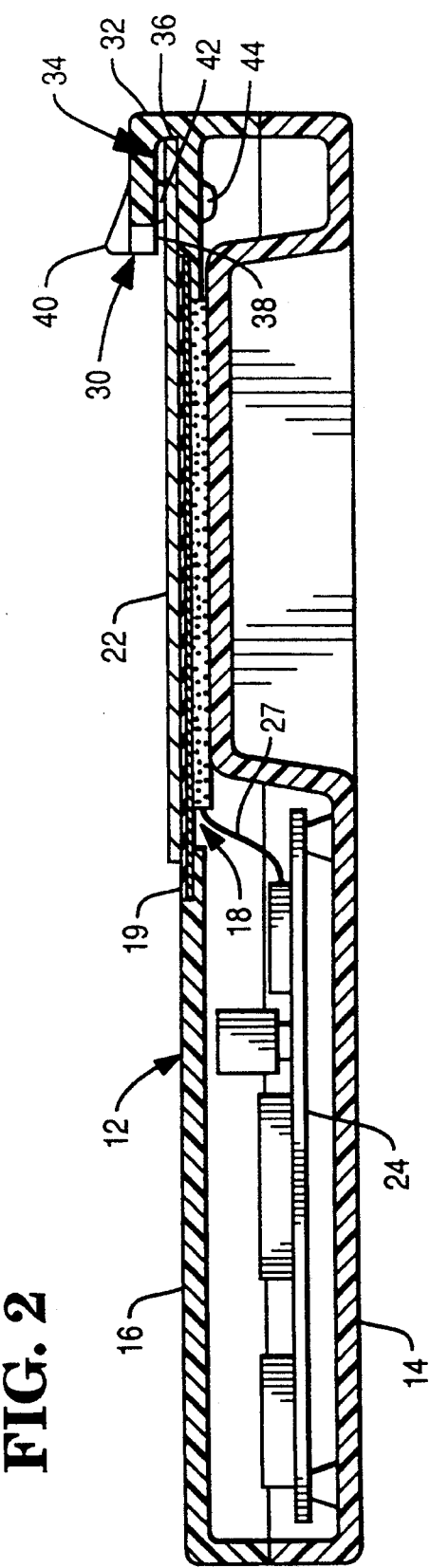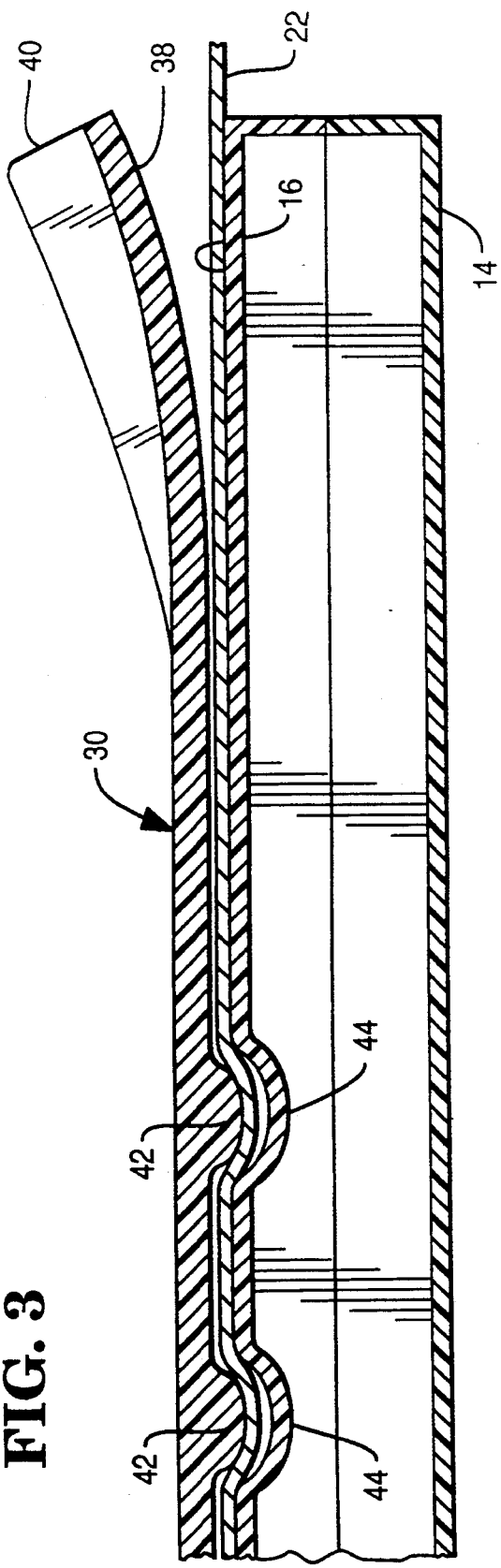

HANDWRITING CAPTURE DEVICE

This is a continuation, of application Ser. No. 07/878,671, filed May, 5, 1992.

CROSS REFERENCE TO RELATED APPLICATION

The present invention is related to commonly assigned and co-pending U.S. application entitled, "Write Input Transaction Apparatus and Method", filed Aug. 30, 1990, invented by Allgeier et al., and having a Ser. No. 07/575,096.

BACKGROUND OF THE INVENTION

The present invention relates to signature capture devices and more specifically to a handwriting capture device.

Today, retailers are burdened with having to store and retrieve large amounts of paper records from credit and check transactions. Normally, these records are produced at a retail terminal as master copies of sales receipts, and which are removed from the terminal at the end of the business day for balancing and entry into accounting journals and shipment to processing and storage facilities. Allgeier et al. discloses a write input device employing a display underneath a transparent digitizer to capture signature information. The display gives a customer feedback for stylus input.

While the Allgeier et al. device works well, having a liquid crystal display makes it expensive. Therefore, it would be desirable to eliminate the display and reduce the cost by using a low-cost resistive membrane digitizer. The low-cost resistive membrane must function in response to minimal signing force applied by an ordinary writing instrument such as a pen.

The use of pressure-sensitive resistive membrane digitizers is subject to false actuations, including those caused by finger contact. If the digitizer is shorted by finger contact during signing, the digitized points representing the signature will be obscured by the finger points, resulting in random scribbling in place of the signature.

The sensitivity of a pressure-sensitive digitizer is determined by the density of the spacer dot pattern, which maintains separation between the top and bottom sheets of the digitizer. The more dense the pattern is, the more resistant the digitizer is to finger actuation. However, a high pattern density requires more writing force to capture a signature. In systems without displays or other sources of immediate feedback, it is essential that the digitizer be sensitive to writing force.

Therefore, it would be desirable to provide a handwriting capture device without a display, but having a digitizer sensitive to minimal writing force.

SUMMARY OF THE INVENTION

In accordance with the teachings of the present invention, a handwriting capture device is provided. The handwriting capture device includes a housing having a top surface, a pressure-sensitive digitizer having a low pattern density and mounted in the top surface, circuitry for sensing the presence of a receipt and activating the digitizer, circuitry for processing signature information from the digitizer, and a clamp for retaining the receipt in place over the digitizer. In the preferred embodiment, the clamp also serves to minimize finger contact with the digitizer.

It is accordingly an object of the present invention to provide a handwriting capture device.

It is another object of the present invention to provide a handwriting capture device, which is less expensive than a handwriting capture device employing a liquid crystal display mounted beneath a transparent digitizer.

It is another object of the present invention to provide a handwriting capture device which employs a highly sensitive low-cost digitizer which can capture signatures entered using minimal force from an ordinary writing instrument, such as a ballpoint pen.

It is another object of the present invention to provide a handwriting capture device which employs a clamp for holding a pre-printed receipt in place over the digitizer for signature.

It is another object of the present invention to provide a handwriting capture device which employs a clamp for holding a pre-printed receipt in place over the digitizer for signature and which minimizes finger contact with the digitizer.

It is another object of the present invention to provide a handwriting capture device which is lightweight, hand-held, and portable.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a perspective view of a first embodiment of the handwriting capture device of the present invention;

FIG. 2 is a sectional view of the handwriting capture device taken along line 2—2 of FIG. 1.

FIG. 3 is a sectional view of the handwriting capture device of the present invention taken along lines 3—3 of FIG. 1;

DETAILED DESCRIPTION OF THE PREFERRED EMBODIMENT

Figure 4:
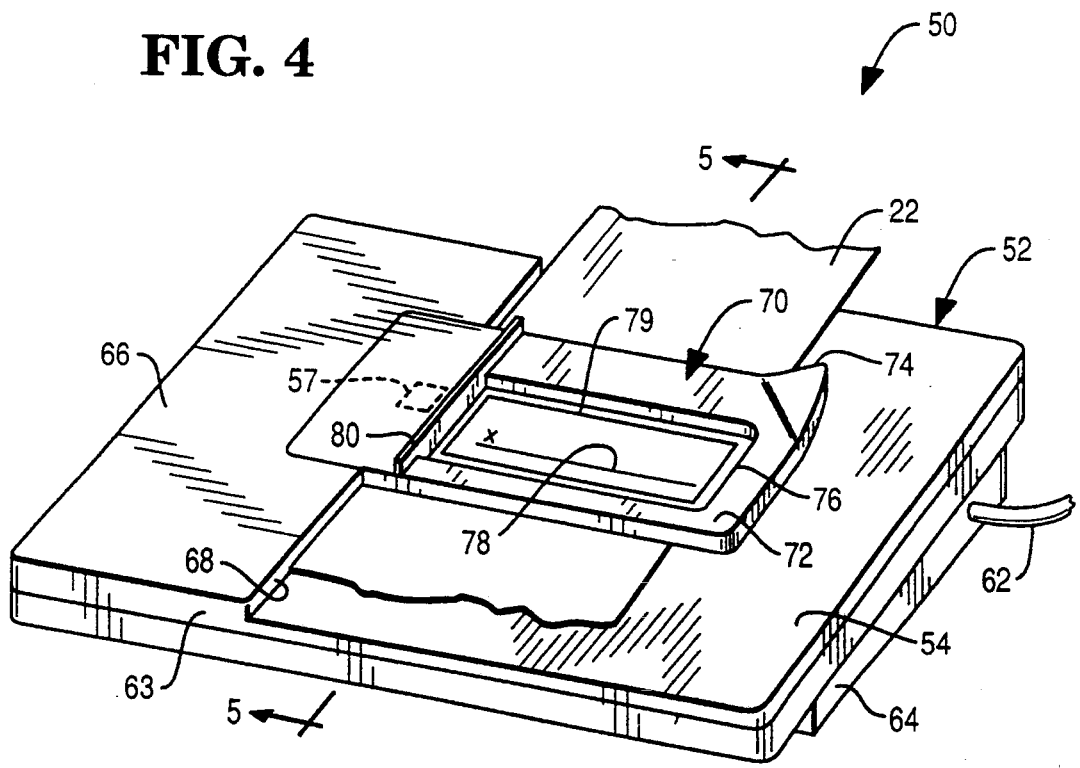
FIG. 4 is a perspective view of a second embodiment of the handwriting capture device of the present invention.

Turning now to FIGS. 1 and 2, a first embodiment of the handwriting capture device 10 of the present invention is shown. The handwriting capture device 10 includes a housing 12 having a bottom supporting surface 14 and a top surface 16. In this embodiment, the housing 12 is generally rectangular in shape. The handwriting capture device 10 is lightweight and portable. The left end of the housing 12 is sufficient in width and depth to facilitate grasping of the housing 12.

Within the top surface 16 is a pressure-sensitive digitizer 18, although other types of digitizers are also envisioned. The digitizer 18 is sensitive to signing forces greater than or equal to a predetermined minimum signing force, which is no more than about 10 to 15 grams. When a pen is used, the digitizer has a sensitivity sufficient to capture a handwriting that produces a legible ink impression on the receipt. In this embodiment, a digitizer manufactured by W. H. Brady & Co. and having a part number 2500044089 is used. This digitizer has a near separation between dots of 0.2 inches. Dot separations higher than 0.2 are not recommended because spurious digitizer readings are more likely to occur. Digitizers having dot separations as low as 0.16 inches may be used in the present invention to achieve valid handwriting capture.

A thin layer of urethane rubber 19 is affixed to the top surface of the digitizer 18. The urethane rubber 19 provides a high friction surface for keeping the receipt 22 in place. A signature line 20 on the upper surface 16 and to the left of the digitizer acts as a guide for lining up a receipt 22 having a signature line 21.

Also within the housing 12 is the electronic processing circuitry 24 for operating the digitizer 18 and for controlling information flow from the digitizer 18 to a point-of-service (POS) terminal. The digitizer 18 is coupled to the electronic circuitry 24 by a wire connector 27 and the electronic circuitry 24 is coupled to the POS terminal by a wire cable 26. The housing may also include circuitry 25 for sensing the presence of the receipt 22 and activating the digitizer 18. In this embodiment, circuitry 25 includes a commercially available optical switch having an emitting side and a receiving side, both on opposite sides of the receipt. The sensing circuit 25 activates data capture by the digitizer 18 when the receipt 22 is in position under a clamp 30 so as to minimize acceptance of false actuations.

The paper receipt 22 from the POS terminal is properly aligned and held in place during movement of the device 10 by the clamp 30 which is integrally located on the top surface 16 at the right end of the housing 12. The clamp 30 includes an inverted, generally L-shaped member 32 having an inner surface 34. A vertical portion 36 of the inner surface 34 provides a stop against which the receipt 22 is aligned. A horizontal portion 38 of the inner surface 34 holds the receipt 22 in contact with the top surface 16 of the housing 12. The distance from the horizontal surface 38 to the top surface 16 is sufficient to allow a receipt 22 to pass between the two surfaces. The clamp 30 also includes an upwardly flared portion 40 at one end to facilitate insertion of the receipt 22 into the clamp 30.

Referring now to FIG. 3, the horizontal portion 38 of the inner surface 34 includes downwardly facing protrusions 42 which are generally hemispherical in shape in order to fixedly retain the receipt 22 in place. Correspondingly shaped receptacles or dimples 44 are located in the top surface 16 below the protrusions 42. In combination, the dimples 44 and protrusions 42 act to increase the frictional force between the top surface 16 and the receipt 22, thereby effectively retarding movement of the receipt 22 out of the clamp 30.

In operation, a POS operator inserts the right edge of the receipt into the clamp 30, starting at the upwardly flared portion 40. The receipt 22 is further inserted until the signature line 21 is properly aligned with the signature line 20 on the top surface 16 of the housing 12. In this position, the receipt 22 will also be properly aligned with the vertical surface 36 of the clamp 30 and properly engaged between the dimples 44 and the protrusions 42. The sensing circuitry 25 activates data capture by the digitizer 18. A customer then signs his name with a writing device, such as a pen, on the signature line 21. Advantageously, the handwriting capture device 10 is lightweight and can be easily transferred from person to person without dropping the receipt 22.

Figure 5:
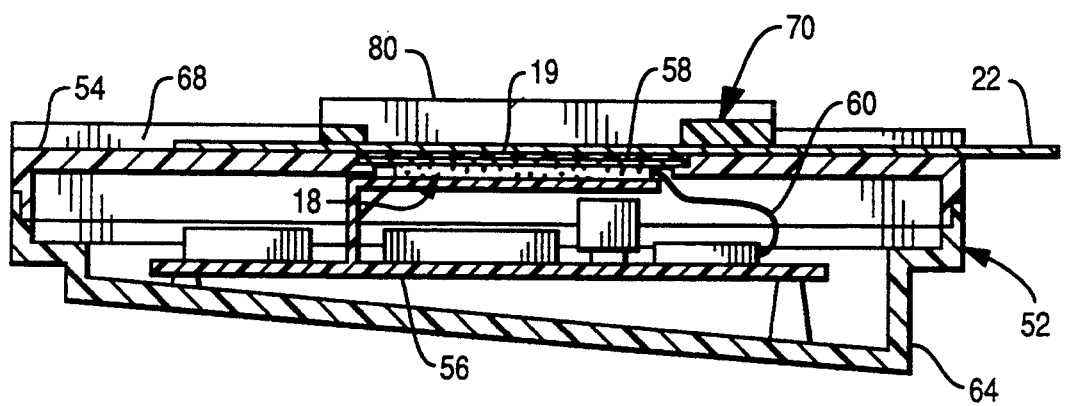
FIG. 5 is a sectional view of the handwriting capture device of the present invention taken along line 5—5 of FIG. 4.

Referring now to FIGS. 4 and 5, a second and preferred embodiment 50 of the handwriting capture device of the present invention is shown. Like the first embodiment, the preferred embodiment 50 includes a housing 52 having a top surface 54, electronic processing circuitry 56 within the housing 52, sensing circuitry 57 within the clamp 30, and a digitizer 18 within the top surface 54. The same considerations as in the first embodiment regarding digitizer choices apply in this embodiment. A thin layer of urethane rubber 19 is affixed to the top surface of the digitizer 18 to provide a high friction surface for keeping the receipt 22 in place. The electronic processing circuitry 56 is coupled to the digitizer 18 through a wire connector 60 and to a POS terminal through a wire cable 62.

In addition, the housing 52 includes a top member 63 and a base member 64 which is inclined to facilitate writing. In order to properly align a receipt 22 for signature, the housing 52 includes a guide member 66 on the top surface 54 at one end of the housing 52. The guide member 66 has a vertical guide surface 68 against which the receipt 22 is aligned. The housing 52 is sufficient in width and depth to facilitate grasping of the housing 52.

The preferred embodiment also includes a clamp 70 for retaining the receipt 22 in place during movement of the device 50. The clamp 70 includes a frame member 72 which is generally rectangular in shape and which is made of transparent plastic to allow a customer to view the itemized information on the receipt 22 while signing. The clamp 70 is anchored at its left end and its right end is biased against the top surface 54 of the housing 52. Centrally located within the clamp 70 is a rectangular window 76 exposing the digitizer 18 below. The window 76 facilitates proper installation of the receipt 22 over the digitizer 18 and serves to quickly orient a customer with the correct location 78 for signing. The clamp 70 may also include an upwardly flared portion 74 for facilitating insertion of the receipt 22 under the clamp.

Advantageously, the clamp 70 also serves to minimize finger contact with the digitizer 18. The clamp 70 includes a vertical rib 80 extending across the clamp 70 for guarding the digitizer 18 from the thumb of the left hand of a customer writing with his right hand and also restricts access to the digitizer 18 by a customer writing with his left hand. The frame member 72 blocks contact with the digitizer 18 by the right hand. In addition, the window 76 provides insufficient room for finger placement, forcing finger placement on the pen to be a predetermined distance upwards from the pen tip for both right and left-handed customers.

In operation, a POS operator holds the device 50 in one hand and inserts the receipt using the other hand by slipping the receipt 22 under the upwardly flared portion 74 until the receipt 22 rests against the vertical guide surface 68 and the signature line 78 or box 79 is within the window 76. A customer then signs his name with a writing device, such as a pen, on the signature line 78. Advantageously, the clamp design facilitates one-handed insertion of the receipt 22. Also, the handwriting capture device 50 is lightweight and can be easily transferred from person to person without dropping the receipt 22.

Although the invention has been described with particular reference to certain preferred embodiments thereof, variations and modifications of the present invention can be effected within the spirit and scope of the following claims.

What is claimed is:

1. A point-of-service (POS) system comprising:

a POS terminal; and a signature capture device coupled to the POS terminal including a housing having a top surface, the top surface having a length;

a digitizer, mounted within the top surface;

a retainer located externally on the top surface which holds a paper receipt from the POS terminal in a predetermined position on the top surface for allowing a signature to be simultaneously applied to the receipt and the digitizer, wherein the retainer is capable of holding paper receipts from the POS terminal of various lengths, including lengths greater than the length of the top surface; and a processing circuit which is coupled to the digitizer and which processes the signature and controls information flow from the signature capture device to the POS terminal.

2. The system as recited in claim 1, wherein the POS terminal and the signature capture device are coupled by a wire cable.

3. The system as recited in claim 1, wherein the digitizer comprises a pressure-sensitive digitizer.

4. The system as recited in claim 1, wherein the retainer forms a guide for aligning an edge of the receipt along the guide.

5. The system as recited in claim 1, wherein the top surface of the housing is inclined towards an operator to facilitate handwriting.

6. The system as recited in claim 1, herein the retainer is also operative to identify the location of the digitizer.

7. The system as recited in claim 1, wherein the top surface has a signature line for aligning a corresponding signature line of the receipt over the digitizer.

8. The system as recited in claim 1, wherein the retainer comprises:

a planar member extending over a part of the digitizer less than the entire digitizer from a position on the top surface adjacent only one side of the digitizer.

9. The system as recited in claim 6, wherein an edge of the retainer identifies the location of the digitizer.

10. A point-of-service (POS) system comprising:

a POS terminal; and a signature capture device coupled to the POS terminal including a housing having a top surface, the top surface having a length;

a digitizer, mounted within the top surface;

a guide on the top surface for aligning an edge of a paper receipt from the POS terminal along the guide for allowing a signature to be Simultaneously applied to the receipt and the digitizer, wherein the guide is capable of aligning paper receipts from the POS terminal of various lengths, including lengths greater than the length of the top surface; and a processing circuit which is coupled to the digitizer and which processes the signature and controls information flow from the signature capture device to the POS terminal.

11. The system as recited in claim 10, wherein the POS terminal and the signature capture device are coupled by a wire cable.

12. The system as recited in claim 10, wherein the digitizer comprises a pressure-sensitive digitizer.

13. The system as recited in claim 10, further comprising a retainer located externally on the top surface which holds the paper receipt from the POS terminal in a predetermined position on the top surface.

14. The system as recited in claim 10, wherein the top surface of the housing is inclined towards an operator to facilitate handwriting.

15. The system as recited in claim 10, further comprising a guard over the receipt for minimizing undesired contact with the digitizer.

16. The system as recited in claim 10, wherein the top surface has a signature line for aligning a corresponding signature line of the receipt over the digitizer.

17. A method for capturing a signature comprising the steps of:

generating a paper receipt requiring the signature on a point-of-service (POS) terminal;

providing a signature capture device, having a top surface which has a length, and including a digitizer and a retainer which holds the paper receipt in a predetermined position on the digitizer, wherein the retainer is capable of holding paper receipts from the POS terminal of various lengths, including lengths greater than the length of the top surface;

inserting the paper receipt between the retainer and the digitizer;

applying the signature simultaneously to the digitizer and to the paper receipt;

processing a signal representing the signature from the digitizer; and sending the processed signal from the signature capture device to the POS terminal.

18. The method as recited in claim 17, further comprising the step of:

aligning an edge of the receipt along a guide surface adjacent one side of the digitizer.

19. The method as recited in claim 17, wherein the step of sending comprises the substep of:

coupling the signature capture device to the POS terminal using a wire cable.

20. The method as recited in claim 18, wherein the step of aligning comprises the substep of:

aligning a signature line on the paper receipt with another signature line on the top surface adjacent to the receipt.

21. The method as recited in claim 17, wherein the digitizer comprises a pressure-sensitive digitizer.

22. The method as recited in claim 17, further comprising the step of:

aligning a signature area on the paper receipt over the digitizer before the step of applying the writing.

23. A method for capturing a signature without immediate feedback from an electronic display comprising the steps of:

generating a paper receipt on a point-of-service (POS) terminal;

providing a signature capture device, having a top surface which has a length, and including a digitizer and a guide surface adjacent one side of the digitizer;

aligning one edge of the paper receipt along the guide surface so that a signature area on the paper receipt is over the digitizer, wherein the guide surface is capable of aligning paper receipts from the POS terminal of various lengths, including lengths greater than the length of the top surface;

applying the signature simultaneously to the digitizer and to the paper receipt substantially within the signature area;

processing a signal representing the signature from the digitizer;

sending the processed signal from the signature capture device to the POS terminal.

24. The method as recited in claim 23, further comprising the step of:

retaining the receipt in a predetermined position over the digitizer.

25. The method as recited in claim 23, wherein the step of sending comprises the substep of:

coupling the signature capture device to the POS terminal using a wire cable.

26. The method as recited in claim 23, wherein the step of aligning comprises the substep of:

aligning a signature line on the paper receipt with another signature line on the top surface adjacent to the receipt.

27. The method as recited in claim 23, wherein the digitizer comprises a pressure-sensitive digitizer.

28. A signature capture device comprising:

a housing having a top surface, the top surface having a length;

a digitizer, mounted within the top surface;

a retainer located externally on the top surface which holds a paper receipt from a POS terminal in a predetermined position on the top surface for allowing a signature to be simultaneously applied to the receipt and the digitizer, including a planar member extending over a part of the digitizer less than the entire digitizer from a position on the top surface adjacent only one side of the digitizer, wherein the retainer is capable of holding paper receipts of various lengths, including paper receipts having lengths greater than the length of the top surface; and a processing circuit which is coupled to the digitizer and which processes the signature and controls information flow from the signature capture device to the POS terminal.

29. A signature capture device comprising:

a housing having a top surface, the top surface having a length;

a digitizer, mounted within the top surface;

a retainer located externally on the top surface which holds a paper receipt from a POS terminal in a predetermined position on the top surface, including a planar member extending over a part of the digitizer less than the entire digitizer from a position on the top surface adjacent only one side of the digitizer, wherein the planar member contains an aperture for allowing a signature to be simultaneously applied to the receipt and the digitizer through the aperture, and wherein the retainer is capable of holding paper receipts of various lengths, including paper receipts having lengths greater than the length of the top surface; and a processing circuit which is coupled to the digitizer and which processes the signature and controls information flow from the signature capture device to the POS terminal.

* * * * *

UNITED STATES PATENT AND TRADEMARK OFFICE
CERTIFICATE OF CORRECTION

PATENT NO. : 5,380,958
DATED :
INVENTOR(S) : January 10, 1995
Robert L. Protheroe et al.

It is certified that error appears in the above-indentified patent and that said Letters Patent is hereby corrected as shown below:

Title Page, Item [63] Continuation of Ser. No. 878,671, May 5, 1992, Pat. No. 5,227,590, add --; which is a Continuation of Ser. No. 703,430, May 17, 1991, Pat. No. 5,120,906--

Col. 1, line 5, after 1992, insert --; and issued as Pat. No. 5,227,590, which is a Continuation of Ser. No. 703,430, filed May 17, 1991 and issued as Pat. No. 5,120,906--.

Signed and Sealed this

Twenty-sixth Day of September, 1995

Attest:

BRUCE LEHMAN

*Attesting Officer*    *Commissioner of Patents and Trademarks*